J. H. FOLLIOTT.
Churn.
No. 209,033.  Patented Oct. 15, 1878.
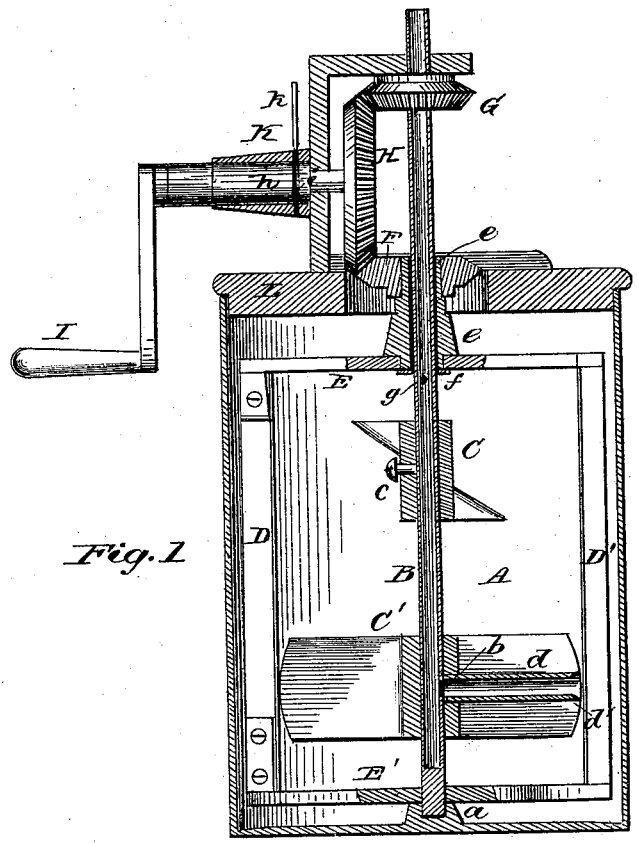

UNITED STATES PATENT OFFICE.

JAMES H. FOLLIOTT, OF PORT CLINTON, OHIO.

IMPROVEMENT IN CHURNS.

Specification forming part of Letters Patent No. 209,033, dated October 15, 1878; application filed July 16, 1878.

*To all whom it may concern:*

Be it known that I, JAMES H. FOLLIOTT, of Port Clinton, in the county of Ottawa and State of Ohio, have invented certain new and useful Improvements in Rotary Churns; and I do hereby declare that the following is a full, clear, and exact description thereof, which will enable others skilled in the art to which it appertains to make and use the same, reference being had to the accompanying drawings, which form a part of this specification, and in which—

Figure 1 is a vertical section, and Fig. 2 is a perspective view of the dasher detached.

Similar letters of reference indicate corresponding parts in both the figures.

My invention relates to rotary churns; and it consists in the construction and combination of parts of a double-acting aerating churn, substantially as hereinafter more fully set forth, and pointed out in the claim.

In the drawing, A is the outer cylinder or churn-body, made of wood, earthenware, or metal, and having a central journal-bearing, $a$, in the botttom.

B is the dasher-staff, which is tubular, but closed at its lower end, which is stepped into the journal-block or seat $a$, having an opening, $b$, some distance above.

Upon the staff are secured, by set-screws $c$ $c$, the inner dashers, C C', two in number, and each shaped precisely like a two-bladed propeller for steamships, the dashers being set upon the shaft or staff at right angles to each other, and so disposed, relative to the pitch of their blades, that, when they are rotated, the upper propeller, C, will force the cream in a downward direction, while the lower propeller, C', will have an opposite tendency and force the cream upward.

The action of the two horizontally-revolving dashers C C' is, besides centrifugal, forcing the cream toward the sides of the churn, where it is cut by the outer rectangular dasher or stirrer, D D'. This latter consists of two cross-pieces, E E', united by the side pieces or vertical dasher-blades D D'.

To the middle of the upper cross-piece, E, is secured a collar, $e$, the upper part of which, $e'$, is squared off to fit into a square socket of the pinion F.

The under side of the upper cross-piece, E, rests upon a washer, $f$, supported by a pin, $g$, inserted transversely through the shaft or staff B, which enables it to rotate freely, the end of the staff passing through a perforation in the middle of the lower cross-bar, E'.

The lower propeller or dasher, C', is made with a tube, $d$, upon the under side of one of its blades, which reaches in through the hub opposite to the opening $b$ in shaft B, through which it communicates with the tubular shaft or staff, as shown in Fig. 1.

By the rapid revolutions of the propeller C' a vacuum is created behind its blades or wings as these work through the cream, and the outer end of tube $d$ being cut off slantingly, as shown at $d'$, Fig. 2, this vacuum is communicated to tube $d$ and shaft B, causing a current of air to pass through from the outside, by which the cream is thoroughly aerated during the process of churning. By means of the set-screw $c$ in the upper propeller, C, this may be adjusted upon the dasher-staff at any desired height, according to the quantity of cream in the churn.

G is a pinion keyed upon the upper end of the tubular staff B, and a rotary motion, in opposite directions, is given to pinions G F, operating the dashers C C' and D D', respectively, by the bevel-wheel H, which is operated by the shaft $h$ and crank I.

Shaft $h$ passes through a cylindrical box, K, cast in one piece with the gearing support or bracket, which is secured upon the cover L, and (shaft $h$) has an annular groove, $i$, to admit of the insertion, through the box K, of the retaining-pin $k$.

To remove the cover L from the churn and dasher, this pin $k$ is removed, which permits shaft $h$ to be pushed back in box K, thereby throwing the bevel-wheel H and pinions G F out of gear, so that the cover and dasher-staff, with their respective attachments, may readily be detached from each other.

By loosening the key of the upper pinion, G, the inner dashers will cease their revolutions, so that the butter may be removed without stopping the other operating parts of the churn.

Having thus described my invention, I claim and desire to secure by Letters Patent of the United States—

The combination of staff B, having pinion G and propellers C C', with the outer dasher, consisting of parts D D' E E', operated by the squared collar e e' and pinion F, and hung upon pin g, and washer f, substantially as and for the purpose herein shown and described.

In testimony that I claim the foregoing as my own I have hereto affixed my signature in presence of two witnesses.

JAMES H. FOLLIOTT.

Witnesses:
GEORGE R. CLARK,
JOHN H. H. UTHOFF.